Patented Sept. 19, 1950

2,522,966

UNITED STATES PATENT OFFICE 2,522,966

TETRAHYDROPYRANYL-MALONIC ESTERS

John G. Schudel and Robb V. Rice, Hasbrouck Heights, N. J., assignors to Gane's Chemical Works, Inc., New York, N. Y., a corporation of New York No Drawing. Application May 1, 1948, Serial No. 24,673

9 Claims. (Cl. 260—333)

This invention relates to new and useful organic chemical compounds comprising substituted malonic esters containing the tetrahydropyranyl radical as at least one of the substituents on the methylene carbon atom. These esters are useful as intermediates in the preparation of other products, particularly, disubstituted barbituric acids and their salts, which have valuable medicinal properties.

The malonic esters to which the invention relates are the methyl, ethyl, propyl, or butyl malonates, the diethyl malonates being preferred for convenience of preparation. One of the methylene hydrogen atoms of these malonic esters is replaced by a tetrahydropyranyl radical, the point of attachment of the malonic ester being at the 2-position of the tetrahydropyranyl ring. The second methylene hydrogen of these malonic esters may be retained or it may be replaced by an organic radical of the class comprising alkyl, alkenyl, aryl, aralkyl, cycloalkyl, cycloalkenyl, or tetrahydropyranyl.

These new compounds may be represented by the formula

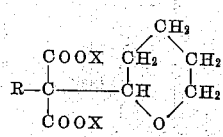

where X represents an alkyl radical having not more than four carbon atoms, namely, methyl, ethyl, propyl, or butyl, and R represents one of the following classes of radicals: hydrogen; a saturated or unsaturated alkyl group, open chain or cyclic, having from one to six carbon atoms; phenyl or substituted phenyl; aralkyl; and tetrahydropyranyl.

The tetrahydropyranyl malonic esters which are the subject of this invention are prepared by gradually adding slightly in excess of one molecular equivalent of 2-chlorotetrahydropyran, or a solution of 2-chlorotetrahydropyran in an inert solvent, for example, toluene, to a solution or suspension in an inert solvent, for example, toluene, of the sodium salt of a malonic ester aforesaid, i. e., methyl-, ethyl-, propyl-, or butyl malonate, which contains on the methylene carbon atom, one of the R radicals enumerated above. The temperature during the addition of the 2-chlorotetrahydropyran may be anywhere between —15° C. and +100° C. However, a temperature of +5° C. to +10° C. is preferred. After the 2-chlorotetrahydropyran has been added, the mixture is allowed to stand at room temperature until it no longer shows an alkaline reaction. Water is added to dissolve the sodium chloride formed in the reaction, whereupon the solution of the ester in the inert solvent is separated from the water solution, and the solvent is removed from the ester by distillation. The crude ester is purified by distillation, preferably in vacuo.

The 2-chlorotetrahydropyran for the above reaction, is prepared by saturating a toluene solution of dihydropyran with hydrogen chloride gas at —10° C. to 0° C. This solution is used directly without isolating the 2-chlorotetrahydropyran.

Solutions or suspensions of sodium salts of malonic esters may be prepared in a variety of ways well known to the art. The preferred procedure of the present invention consists in preparing a suspension of the sodium salt by gradually warming to a maximum of 90° C., a toluene solution of a malonic ester containing one of the R radicals enumerated above, with powdered sodium hydride until no more hydrogen gas is evolved.

The invention is further illustrated by the following examples, but is not limited to these examples.

EXAMPLE I

*Ethyl tetrahydropyranyl diethyl malonate*

2-chlorotetrahydropyran is prepared by passing anhydrous hydrogen chloride gas into a solution of 88 g. (grams) of dihydropyran in 200 cc. (cubic centimeters) of dry toluene at —10° C. to 0° C. until no more hydrogen chloride is absorbed.

The sodium salt of ethyl diethyl malonate is prepared by stirring and gradually warming a mixture of 188 g. of ethyl diethyl malonate, 25 g. of powdered sodium hydride, and 1500 cc. of dry toluene at a maximum of 90° until the evolution of hydrogen gas has ceased. The resulting suspension is cooled to 20° C. and the cold solution of 2-chlorotetrahydropyran is added gradually during stirring and cooling so that the temperature does not exceed 30° C. After standing for three hours, the reaction mixture gives an acid reaction to litmus. It is stirred with 350 cc. of water, the water layer is separated, and the toluene solution of the ester is distilled to remove the toluene. The residue of crude ester is purified by distillation in vacuo.

The purified compound comprising ethyl tetrahydropyranyl diethyl malonate is a colorless liquid, B. P. 115–117° C. at 2 mm. (millimeters of mercury). Refractive index 1.4525 at 20° C. It is represented by the formula

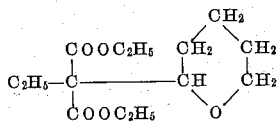

EXAMPLE II

*Phenyl tetrahydropyranyl diethyl malonate*

2-chlorotetrahydropyran is prepared as described in Example I. A suspension of the sodium salt of phenyl diethyl malonate is prepared from 236 g. of phenyl diethyl malonate, 25 g. of powdered sodium hydride, and 1500 cc. of dry toluene in the manner described in Example I. The suspension of the sodium salt of the phenyl malonic ester is cooled to 10° C. and the 2-chlorotetrahydropyran solution in toluene is added slowly with stirring at 10–15° C. After standing for five hours at room temperature, 350 cc. of water is added and mixed well. The water layer is separated and the toluene solution of the ester is distilled. The crude ester is purified by distillation in vacuo. Phenyl tetrahydropyranyl diethyl malonate distills as a pale yellow liquid that is usually supercooled below its melting point. Upon standing it solidifies into a pale yellow, crystalline solid, M. P. 78–81.5° C. Its boiling point is 169–171° C. at 7 mm. The supercooled liquid has a refractive index of 1.5021 at 25° C. Phenyl tetrahydropyranyl diethyl malonate may be represented by the formula

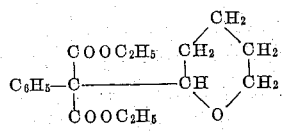

EXAMPLE III

*Tetrahydropyranyl diethyl malonate*

2-chlorotetrahydropyran is prepared as described in Example I, using 88 g. of dihydropyran, 200 cc. of toluene and hydrogen chloride gas. A suspension of the monosodium salt of diethyl malonate is prepared as described in Example I, using 160 g. diethyl malonate, 25 g. sodium hydride and 1500 cc. dry toluene. The suspension is cooled to 5° C. and the solution of 2-chlorotetrahydropyran is added slowly during stirring at a temperature of 5° to 10° C. The reaction mixture is allowed to stand for several hours at room temperature and it then gives an acid reaction with litmus. It is mixed well with 300 cc. of water, the water layer is separated, and the toluene solution of the crude ester is distilled. The ester is purified by distillation in vacuo. Tetrahydropyranyl diethyl malonate is a colorless liquid, B. P. 135–140° at 7 mm. Refractive index 1.4463 at 20° C. It may be represented by the formula

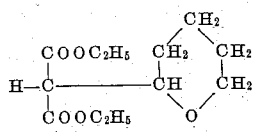

EXAMPLE IV

*1-methylbutyl tetrahydropyranyl diethyl malonate*

2-chlorotetrahydropyran is prepared by passing hydrogen chloride gas into a solution of 176 g. of dihydropyran and 300 cc. of dry toluene at −10° C. to 0° C. until no more hydrogen chloride is absorbed.

A suspension of the sodium salt of 1-methylbutyl diethyl malonate is prepared by warming and stirring a mixture of 460 g. of 1-methylbutyl diethyl malonate, 3000 cc. of dry toluene, and 50 g. of powdered sodium hydride to a maximum of 90° C. until no more hydrogen gas is evolved. The suspension is cooled to 0° C. and the cold solution of 2-chlorotetrahydropyran is added dropwise during cooling and stirring at 0° C. to 5° C. The reaction mixture is allowed to stand for 16 hours at room temperature, then it is mixed well with 500 cc. of cold water and the water layer is separated. The toluene solution of the ester is distilled to remove the toluene and the residue of crude ester is purified by distillation in vacuo.

1-methylbutyl tetrahydropyranyl diethyl malonate is a colorless liquid, B. P. 132–135° C. at 5 mm. Refractive index 1.4583 at 20° C. It may be represented by the formula

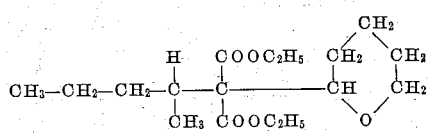

Other diethyl malonates containing the tetrahydropyranyl radical in place of one of the methylene hydrogen atoms of diethyl malonate have been prepared. The methods of preparation are similar to those described in the above examples. Properties of some tetrahydropyranyl diethyl malonates are shown in the table below. These compounds are further characterized by conversion into the corresponding barbituric acid and thiobarbituric acid derivatives.

Table

| Tetrahydropyranyl Diethyl Malonate R is | Boiling Point, °C. | At Pressure of mm. | Refractive Index at 20° C. |
|---|---|---|---|
| Hydrogen | 135–140 | 7 | 1.4463 |
| Ethyl | 115–117 | 1.5 | 1.4525 |
| Isopropyl | 126–130 | 6 | 1.4570 |
| n-Butyl | 121–125 | 3 | 1.4535 |
| iso-Butyl | 123–124 | 5 | 1.4541 |
| iso-Amyl | 125 | 5 | 1.4530 |
| 1-Methylbutyl | 132–135 | 5 | 1.4583 |
| n-Hexyl | 158–159 | 3 | 1.4540 |
| Allyl | 151–154 | 10 | 1.4611 |
| Δ²,³-Cyclopentenyl | 142–146 | 4 | 1.4790 |
| Cyclohexyl | 149–154 | 2 | 1.4760 |
| Phenyl | 169–171 | 7 | 1.5021 (25°) |
| 2-Methylallyl | 117–120 | 1.5 | 1.4642 |
| 2-Bromallyl | 155–157 | 5 | 1.4860 |
| Benzyl | ¹ Solid | | |

¹ Isolated by removing most of the toluene solvent and allowing to crystallize. Filtered and washed with pentane. M. P. 80–81° C. Small white crystals.

What is claimed is:

1. Substituted malonic esters of the general formula

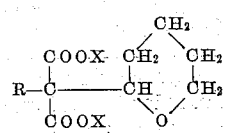

where X is an alkyl radical of not more than four carbon atoms, and R is a radical selected from the group consisting of: hydrogen, alkyl, cycloalkyl, aryl, aralkyl, alkenyl, cycloalkenyl and tetrahydropyranyl.

2. Substituted malonic esters of the formula

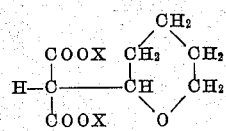

where X is an alkyl radical having not more than four carbon atoms.

3. Substituted malonic esters of the formula:

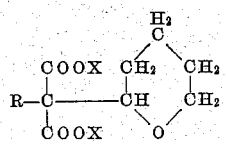

where R is an alkyl radical of from one to six carbon atoms, and X is an alkyl radical having not more than four carbon atoms.

4. Substituted malonic esters of the formula:

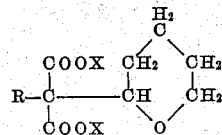

where R is a cycloalkyl containing five to six carbon atoms and X is an alkyl radical having not more than four carbon atoms.

5. Substituted malonic esters of the formula:

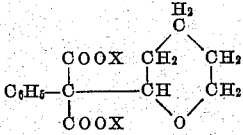

where X is an alkyl radical having not more than four carbon atoms.

6. Process for preparing tetrahydropyranyl malonic esters which comprises: reacting in the presence of an inert aromatic solvent, a member of the group consisting of 2-chloro- and 2-bromo-tetrahydropyran, with an alkali metal salt of a malonic ester of the general formula

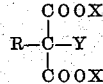

where X is an alkyl radical of not more than four carbon atoms, Y is an alkali metal, and R is a radical selected from the group consisting of: hydrogen, alkyl, cycloalkyl, aryl, aralkyl, alkenyl, cycloalkenyl and tetrahydropyrany.

7. Process for preparing tetrahydropyranyl malonic esters which comprises: reacting in the presence of an aromatic inert solvent, and at a temperature of about —15° to 100° C., a member of the group consisting of 2-chloro- and 2-bromo-tetrahydropyran, with an alkali metal salt of a malonic ester of the general formula

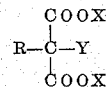

where X is an alkyl radical of not more than four carbon atoms, Y is an alkali metal, and R is a radical selected from the group consisting of: hydrogen, alkyl, cycloalkyl, aryl, aralkyl, alkenyl, cycloalkenyl and tetrahydropyranyl.

8. Substituted malonic esters of the general formula:

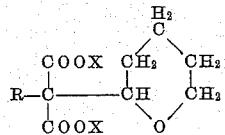

where X is an alkyl radical of not more than four carbon atoms, and R is a radical of not more than six carbon atoms, selected from the group consisting of: hydrogen, alkyl, cycloalkyl, aryl, aralkyl, alkenyl cycloalkenyl and tetrahydropyranyl.

9. Substituted malonic esters of the general formula:

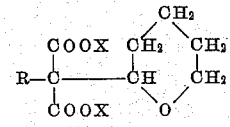

where R is an alkenyl radical of two to six carbon atoms, and X is an alkyl radical having not more than four carbon atoms.

JOHN G. SCHUDEL.
ROBB V. RICE.

REFERENCES CITED

The following references are of record in the file of this patent:

FOREIGN PATENTS

| Number | Country | Date |
|---|---|---|
| 743,075 | Germany | Oct. 28, 1943 |